(12) United States Patent
Sørensen et al.

(10) Patent No.: US 7,530,168 B2
(45) Date of Patent: May 12, 2009

(54) METHOD OF MANUFACTURING A WIND TURBINE BLADE ROOT

(75) Inventors: Flemming Sørensen, Svendborg (DK); Rune Schytt-Nielsen, Them (DK)

(73) Assignee: SSP Technology A/S, Broby (DK)

( * ) Notice: Subject to any disclaimer, the term of this patent is extended or adjusted under 35 U.S.C. 154(b) by 0 days.

(21) Appl. No.: 10/557,727

(22) PCT Filed: Jun. 10, 2004

(86) PCT No.: PCT/DK2004/000405

§ 371 (c)(1),
(2), (4) Date: Feb. 15, 2006

(87) PCT Pub. No.: WO2004/110862

PCT Pub. Date: Dec. 23, 2004

(65) Prior Publication Data

US 2007/0065288 A1 Mar. 22, 2007

(30) Foreign Application Priority Data

Jun. 12, 2003 (EP) .................................. 03388045

(51) Int. Cl.
B23P 15/04 (2006.01)
B21K 3/04 (2006.01)

(52) U.S. Cl. .............. 29/889.21; 29/889.71; 29/889.72; 416/224; 416/230

(58) Field of Classification Search ................ 29/889.2, 29/889.21, 889.6, 889.7, 889.72; 416/204 R, 416/204 A, 213 R, 213 A, 224, 230, 241 A
See application file for complete search history.

(56) References Cited

U.S. PATENT DOCUMENTS

| 3,734,642 | A | * | 5/1973 | Dixon ......................... 416/61 |
| 4,412,784 | A | * | 11/1983 | Wackerle et al. ............ 416/230 |
| 4,420,354 | A | | 12/1983 | Gougeon et al. |
| 4,648,921 | A | * | 3/1987 | Nutter, Jr. .................... 156/77 |
| 4,915,590 | A | | 4/1990 | Eckland et al. |
| 6,305,905 | B1 | * | 10/2001 | Nagle et al. ............. 416/204 R |
| 6,371,730 | B1 | | 4/2002 | Wobben |

FOREIGN PATENT DOCUMENTS

| GB | 2 115 075 A | 9/1983 |
| GB | 2115075 | 9/1983 |
| JP | 11-182408 | 7/1999 |
| WO | WO 01/42647 A2 | 6/2001 |

OTHER PUBLICATIONS

Patent Abstracts of Japan, vol. 1999, No. 12, Oct. 29, 1999; JP 11-182408A, Mitsubishi Heavy Ind. St, Jul. 16, 1999.

* cited by examiner

*Primary Examiner*—David P Bryant
*Assistant Examiner*—Sarang Afzali
(74) *Attorney, Agent, or Firm*—Sughrue Mion, PLLC

(57) ABSTRACT

A wind turbine blade root having fully bonded insert bushings with internal threads for mounting bolts for releasable attachment to a hub of a wind turbine is manufactured by arrangement of a plurality of the insert bushings on a first layer of fibre mat arranged on a holder having a plurality of spaced recesses for accommodation of the insert bushings such that the bushings extend largely in a longitudinal direction of the blade accommodated in the spaced recesses. Subsequently, a number of additional layers of fibre mat are arranged on top of the bushings, and the fibre mat layers are consolidated.

10 Claims, 4 Drawing Sheets

METHOD OF MANUFACTURING A WIND TURBINE BLADE ROOT

The present invention relates to method of manufacturing a blade root for a wind turbine blade having fully bonded insert bushings with internal thread for mounting bolts for releasable attachment to a hub of a wind turbine, the method comprising the steps of providing a first layer of fibre mat, arranging bushings on the first layer of fibre mat to extending largely in the longitudinal direction of the blade, providing additional layers of fiber mat on top of the bushings, and consolidating the fiber mat.

Wind turbines have been used for decades to exploit the energy of the wind e.g. to produce electricity. To reduce the price of electricity produced by such wind turbines, the size of the wind turbines have increased to a current average nominal power of commercial wind turbines of approximately 1.5 MW, while wind turbines of up to 3 MW are under development, and it is expected that even larger wind turbines will be marketed in the coming years. Common commercial wind turbines have three blades, which by a 1.5 MW wind turbine have a length of approximately 35 m.

The blades are subject to large forces and bending moments inter alia due to the wind pressure and due to the weight and rotation of the blades, and further the blades are subject to fatigue because of the cyclic load. For example, during one revolution, the blade travels through a region of maximum wind load in the upper part of the circle, whereas the blade experiences a low wind area (or even lee), when the blade passes the tower, and further the wind is normally not constant, as there may be gusts of wind. Naturally the root of the blade and the connection of the blade to the hub must be able to withstand the load of the blade, and a failure of the blade root or the hub would be devastating and potentially fatal to persons near the wind turbine.

Over the years different approaches have been tried out, as can be seen in U.S. Pat. No. 4,915,590 that discloses a wind turbine blade attachment method. This prior art blade attachment comprises fibre glass sucker rods secured in the blade root, which sucker rods are unbonded to the blade root for a substantial portion forming a free end at the root end, and further the free end of the sucker rods are recessed from the blade root end, which means that the sucker rods can be put under tension. The patent indicates that the sucker rods may be unbonded to the rotor blade for approximately 85% of the length. The sucker rods are tapered down in diameter toward the secured end in the bonded area, where the rod is mated internally to the blade. Although this may be appropriate for relatively small blades used on wind turbines in August 1987, when this US-application was filed, this prior art construction is not suited, however, for the relatively large blades currently used, as the sucker rods will not be able to withstand the very large forces present at the blade root of large blades, especially as the rods are only bonded to the blade root to a very limited extent.

In the blade attachment of WO-A2-01/42647, the blade is connected to the hub by bolts screwed into inserts provided in radial holes in the blade root. It is a disadvantage however, that radial holes must be provided in the blade root, as these holes seriously weakens the construction and provides a stress concentration, which means that the blade root must be constructed to be very strong and hence heavy, which again stresses the construction.

A similar construction is described in U.S. Pat. No. 6,371,730, which discloses a blade connected to the hub by bolts screwed into nuts inserted into radial blind holes in the blade root. Although the holes are not through-going, they nonetheless seriously weaken the blade root, and hence this construction is also not advantageous.

It has also been tried to provide a blade root with fully bonded or embedded bushings each having a projecting threaded bolt part, as disclosed in U.S. Pat. No. 4,420,354. This prior art incorporates drilling a relatively large axially extending hole in the blade root made of a wood-resin composite, in which hole the bushing, having a preformed resin sleeve, is resin bonded. With this prior art a relatively large amount of blade root material is removed, which weakens the construction, so the blade root must be overdimensioned. Especially with large blades of modem composites like fibre-reinforced plastics, which are relatively flexible, stress concentration at the end of the bushings may be detrimental, as the bushings are significantly more stiff. Moreover this prior art method is somewhat destructive, and as fibre composites for the blade root are quite expensive, and increasingly will be as larger blades are developed, as it is expected that high-tech materials like carbon fibre composites will be introduced, this procedure is not favorable.

In general, prior art methods of the kind set forth are quite labor intensive and time consuming, as the bushings are spaced by blocks of e.g. a foam material, and the blocks and the bushings must be arranged carefully. Further there is a risk of air pockets being formed in the blade root between the bushings and the blocks, and such air pockets, which are difficult to detect, will seriously deteriorate the strength of the blade root.

It is an object of the present invention to provide a method of the kind set forth to enable production of a lightweight wind turbine blade having an 30 attachment of high strength.

To achieve this object the method according to the invention is characterized by an initial step of providing a holder having spaced recesses for accommodating the bushings, arranging the first layer of fibre mat on the holder and arranging the bushings in said recesses.

According to an embodiment, the method comprises the additional the step of compacting the fibre mats using vacuum mats, whereby a firm compacting is achieved and the risk of pockets of gas being entrapped in the composites is significantly reduced.

The mats may be dry mats, only containing reinforcing fibres. According to an embodiment, however, the mats are of a pre-preg type, whereby the blade may be produced in a very efficient way, as the whole blade may be consolidated in one piece after laying up of the composite, e.g. by heating to cure a thermosetting binder included in the composite.

In a preferred embodiment of the method use is made of insert bushings comprising a first portion and an extension portion having gradually increased flexibility in the direction away from the first portion. The first portion may have any desirable shape, according to an embodiment, however, the first portion of the bushing is substantially cylindrical. Hereby relatively simple and hence cost effective bushings can be achieved, and further a bushing having a substantially cylindrical first portion will take up relatively little space in the composite material of the blade root.

Hereby is achieved that the bushings, which are embedded in the blade root, and hence are integral therewith, at the same time may provide a strong threaded connection with a bolt for attachment to the hub of the wind turbine, and provide a relatively flexible tip, thereby avoiding development of stress-concentrations thereby a very lightweight blade having an attachment of high strength is hence achieved.

Whereas the first portion of the bushing may have any desirable shape, it is preferred, however, according to an embodiment that the first portion of the bushing is substantially cylindrical. Thereby relatively simple and hence cost effective bushings can be achieved, and further a bushing having a substantially cylindrical first portion will take up relatively little space in the composite material of the blade root.

Preferably, the bushings are metallic, although non-metallic bushings e.g. made of high-strength polymers or polymer composites, can be provided. The extension portion of the bushing may be chamfered to provide a gradually reduced cross section, whereby a gradually increased flexibility is achieved in a very simple way. Further by reducing the cross-section of the extension portion of the bushing, a smooth transition between the first portion of the bushing and the composite construction of the blade root in the direction towards the blade tip. Moreover the risk of pockets of air or gas being trapped in the construction at the bushings is greatly reduced by this smooth transition.

The internal thread of the bushings may extend over the entire length, it is preferred, however, that a first portion of the first portion is threadfree. Thereby a bolt introduced into the bushing and engaged in the thread may be put under tension, such that the blade root can be kept engaged with the hub at all times during the cycle of the blade, independent of the cyclic load on the blade, which load comprises tension and compression forces, and bending and torsion moments.

Although it may be advantageous in some occasions to provide the bushings with barbs, radial flanges or the like on the external surfaces thereof, it is preferred according to an embodiment to use bushings having smooth external surface.

To provide extra grip with the binder for bonding the bushings, the external surfaces of the bushings may be slightly roughened, such as by etching, sand blasting or the like.

In the following the invention will be described in more detail by way of example and with reference to the schematic drawing, in which.

Figure 1:
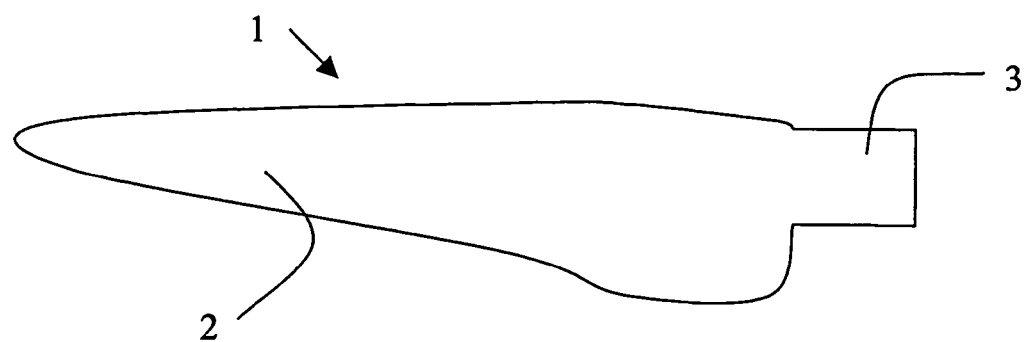
FIG. 1 is a plan view of a wind turbine blade.

A wind turbine blade 1 can be seen in plan view in FIG. 1. The blade 1 comprises an aerodynamically designed portion 2, which is shaped for optimum exploitation of the wind energy, and a blade root 3 for connection to a hub (not shown) of a wind turbine 20. The blade root 3 is a heavily strained area of the wind turbine blade, as the wind turbine blade is subject to large forces due to the wind, the rotating masses etc. As an example common wind turbine blades 1 for a 1.5 MW wind turbine measures approximately 35 25 m and the mass of each blade is approximately 6,000 kg. Most modern wind turbine blades comprise a central, hollow high strength beam and an aerodynamic covering having only limited strength, and normally both the beam and the covering is made from a composite material of e.g. fibre reinforced plastics. Other blade designs comprise an I-beam or no beam in that the covering is reinforced to be self-supporting.

Figure 2:
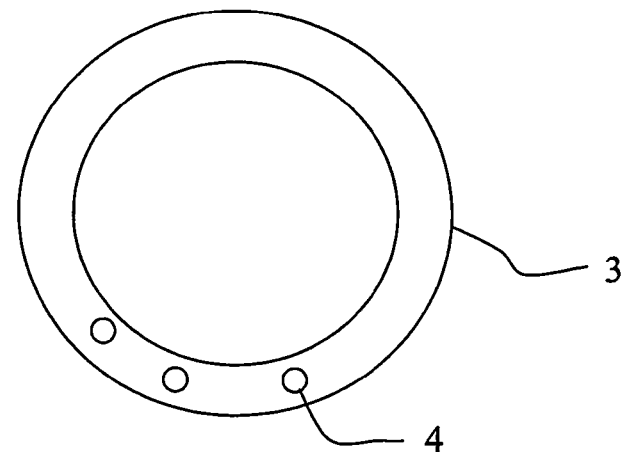
FIG. 2 is an end view of a blade root.

The blade root 3 can be seen in more detail in FIG. 2, which is an end view of the blade root 3. For releasable connection to the hub of a wind turbine, the blade root 3 comprises a plurality of bushings 4, of which only a few is shown, embedded in the blade root 3, so that bolts (not shown) can be screwed into an internal thread of the bushings 4 for firm but releasable engagement therewith.

Figure 3:
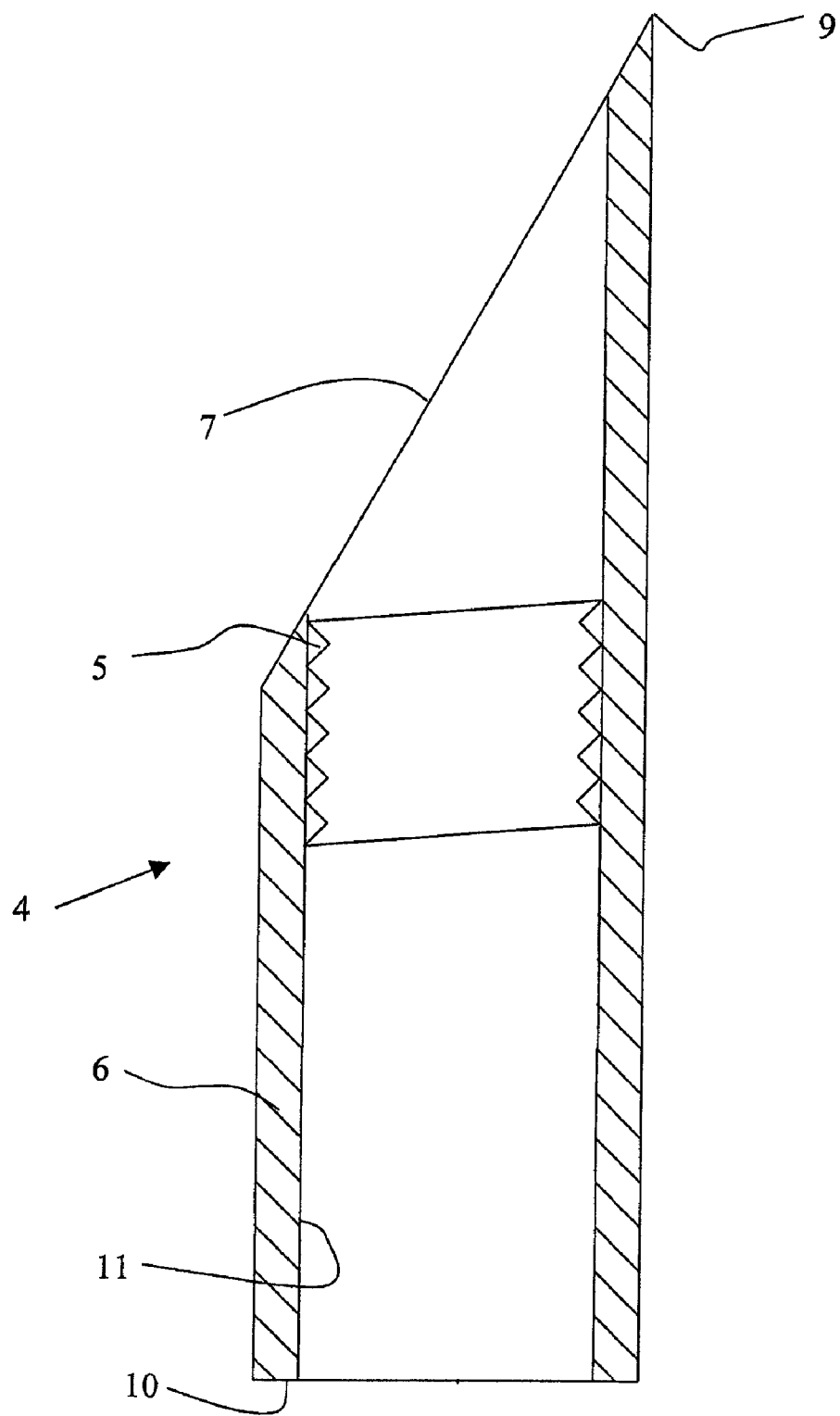
FIG. 3 is a longitudinal section of a bushing.

FIG. 3 is a longitudinal section of a bushing 4, which comprises a first portion 6 and an extension portion 7 having gradually reduced cross-section to a pointed or nearly pointed end 9, so the extension portion has a gradually increased flexibility. The flexibility could of course be provided by other means, such as providing slits or other cut-outs in radial or axial direction, as will be evident to the skilled person. The two portions 6, 7 may be integral or provided as individual parts, which may be connected permanently or releasably, such as by threading, welding, soldering, press-fitting etc. It is presently preferred to produce bushing 4 of two independent parts and releasably join these by a threading, although a more permanent connection could also be used, such as by gluing, welding, brazing or the like. By producing the bushing 4 of two separate parts, machining of the extension portion 7 is more easily performed, and the thread 5 is more easily machined in the bore of the bushing. A M30 thread was used in an embodiment for a 35 m blade. As an alternative, the thread 5 may be provided in the extension portion 7, and the extension portion 7 may be pressfit into the first portion 6.

As schematically illustrated in FIG. 3, the bushing 4 comprises an internal thread 5. By providing a thread-free proximal portion 11 extending from the blade root end 10 of the bushing 4, a bolt screwed into the thread 5 can be put under tension and hence act as a tie rod. Hereby a firm connection with the hub can be achieved, and the bolt will be under tension in operation of the wind turbine. Alternatively the bushing 4 may comprise an internal thread 5 along the entire length thereof, whereas the bolt may be provided with a thread near the tip thereof only, whereby the same result is achieved in that the bolt will be under tension.

Figure 4:
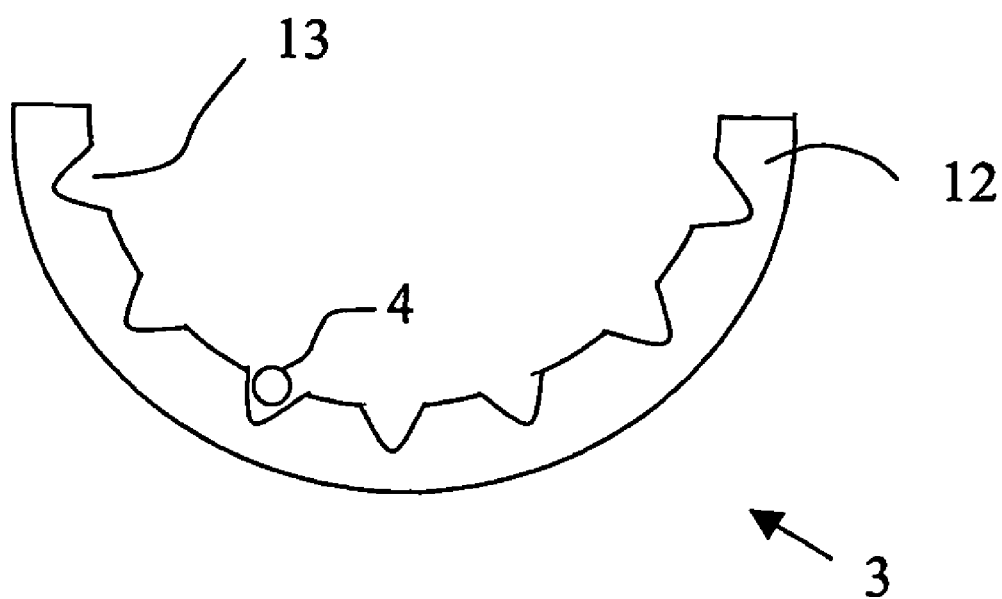
FIG. 4 is an end view of a blade during manufacture.
Figure 5:
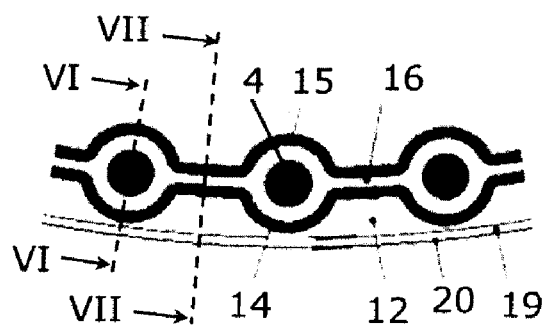
FIG. 5 is a sectional view of the blade root.
Figure 6:
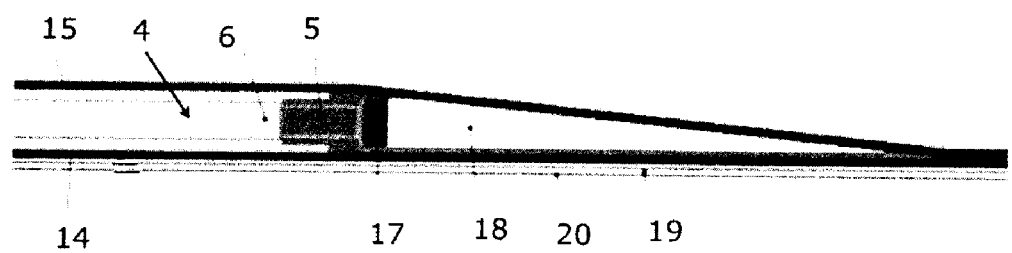
FIG. 6 is a longitudinal section of the blade root along line VI-VI in FIG. 5.
Figure 7:
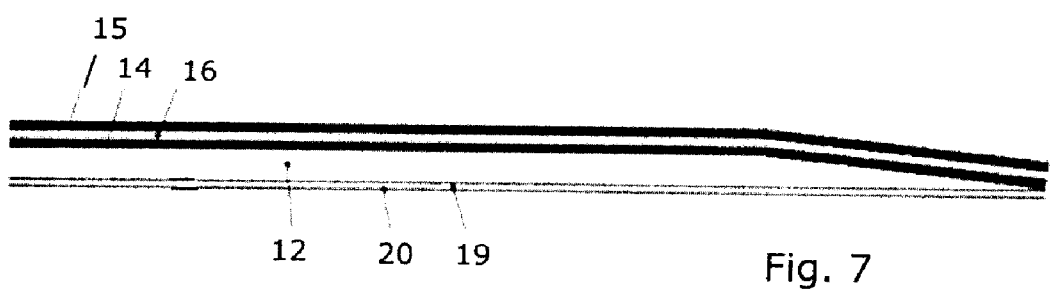
FIG. 7 is a longitudinal section of the blade root along line VII-VII in FIG. 5.

FIG. 4 schematically illustrates a first step in the manufacture of the blade root, which is illustrated in more detail in FIGS. 5-7. The blade root 3 is part of the beam, which preferably is made of two parts, which are assembled after hardening. The blade root 3 is substantially circular, and hence made up of two parts of semicircular cross-section. At least one layer of fibre mat is placed in a mould (not shown), and a holder 12, e.g. made of a foam material, is placed on the fibre mat. The holder 12 has a number of spaced recesses 13 for accommodation of the bushings 4. Prior to placing the bushings 4 in the recesses 13, the holder 12 is lined on the inner side covering the recesses 13 with at least one first layer 14 of fibre mat, and the outer side of the holder 12 is provided with an adhesive 19 and a shell laminate 20. The bushings 4 are then placed in the recesses 13 of the holder 12 on top of the fibre mat layer 14 and fixed to a root plate (not shown) for correct positioning thereof. Fibre glass strips 16, constituting the so-called mid plane, are arranged between the bushings 4 to extend in the longitudinal direction of the blade. Four to five layers of fibre glass strips 16 arranged on top of each other was used in an embodiment. As can be seen in FIG. 7, the layers of fibre glass strips 16 extended at least along the full length of the bushings 4, and were of different length, so a smooth transition area was achieved.

In the embodiment according to FIG. 6, the bushing 4 is made up of two separate parts, namely the first portion 6 and the extension portion 7. The first portion 6 comprises an internal thread at the end for engagement with an external thread of the extension portion 7. Both portions 6, 7 are provide as hollow pipes, however the extension portion is chamfered or ground to provide an extension member having gradually increased flexibility in the direction away from the blade root 3 towards the tip of the wind turbine blade. As can be seen in FIG. 6, a stopper 17 is arranged adjacent the thread 5 in the open end of the bushing 4, to avoid entry of epoxy etc. to the thread 5. Further a foam wedge 18 is arranged in the recess of the bushing 4, to ensure a secure bonding of the bushing and avoid air pockets in the laminate. Additional fibre mat layers 15 are arranged on the bushings 4, so a blade root of laminated construction is provided. When the composite construction blade root is finished, the construction is preferably compacted, e.g. by means of vacuum mats. Hereafter the mats are hardened, such as by applying a binder, such as epoxy by spraying or the like. The bushings 4 are bonded in the laminated blade root construction along the full length of the bushing 4 from the blade root end thereof to the pointed or nearly pointed end 9 thereof, to provide a secure anchoring of the bushing 4 in the blade root 3. After hardening, the root plate is detached from the bushings 4. Preferably the mats are thermosetting, and in this event, the mould accommodating the blade root is heated to a curing temperature. Suitable mats include fibre mats of so-called SPRINT and pre-preg materials, as supplied by the Gurit Heberlein Group, Switzerland, comprising a resin, such as epoxy. The temperature for thermosetting these materials is approximately 120° C. By mats should be understood any kind of web, fabric, mesh etc. made by e.g. weaving, braiding, knitting or some kind of intermingling of filaments of reinforcing fibres, and optional binder of thermoplastic fibres or another type of binder. The mats should preferably extend in the longitudinal direction of the blade to provide a smooth transition between the blade root and the beam.

It is found that the blade according to the invention weighs approximately 4,500 kg, whereas prior art blades weigh approximately 6,000 kg, i.e. a reduction of 25%. Clearly this is a large reduction, which will make handling of the blade during manufacture, transport and fixation thereof much easier and less costly. Further lighter blades means reduced load on the structural parts of the wind turbine.

As an example 54 bushings were embedded in the root of a blade for a 1.5 MW turbine having three blades measuring 35 m and each bushing had a total length of approximately 80 cm. Of course the number and dimensions of the bushings depend on parameters such as material (strength, flexibility etc.) and the shape of the bushings.

The invention claimed is:

1. A method of manufacturing a blade root of wind turbine blade, having a plurality of fully bonded insert bushings having a longitudinal hole with internal thread for mounting bolts for releasable attachment to a hub of a wind turbine, the method comprising the steps of:
   providing an annular holder having a plurality of spaced recesses provided in an inner circumferential surface of the holder;
   lining the inner circumferential surface of the holder with a first fibre mat layer such that said first fibre mat layer is at least partially received in the recesses;
   respectively placing the plurality of insert bushings in said recesses such that said bushings contact the first fibre mat layer and extend substantially in the longitudinal direction of the blade;
   providing an additional fibre mat layer over the insert bushings such that the insert bushing are substantially encased between the first fibre mat layer on an outer radial side of the insert bushings and the additional fibre mat layer on an inner radial side of the insert bushings; and
   consolidating the fibre mat layers.

2. The method according to claim 1, further comprising the additional steps of using mat layers of a pre-preg type, and heating the blade root to consolidate the pre-preg mat layers.

3. The method according to claim 2, wherein said first portion of the insert bushing is substantially cylindrical.

4. The method according to claim 2, wherein the insert bushings are metallic.

5. The method according to claim 2, wherein a proximal portion of said first portion of each insert bushing is thread-free.

6. The method according to claim 2, wherein external surfaces of insert bushings are smooth.

7. The method according to claim 2, wherein external surfaces of insert bushings are slightly roughened.

8. The method according to claim 1, further comprising the step of using each insert bushing comprising a first portion and an extension portion having gradually increased flexibility in the direction away from the first portion.

9. The method according to claim 8, wherein the extension portion of each insert bushing is chamfered to provide a gradually reduced cross-section.

10. The method according to claim 1, further comprising the additional step of compacting the fibre mat layers using vacuum mats.

* * * * *